Figures 1, 2, 3:
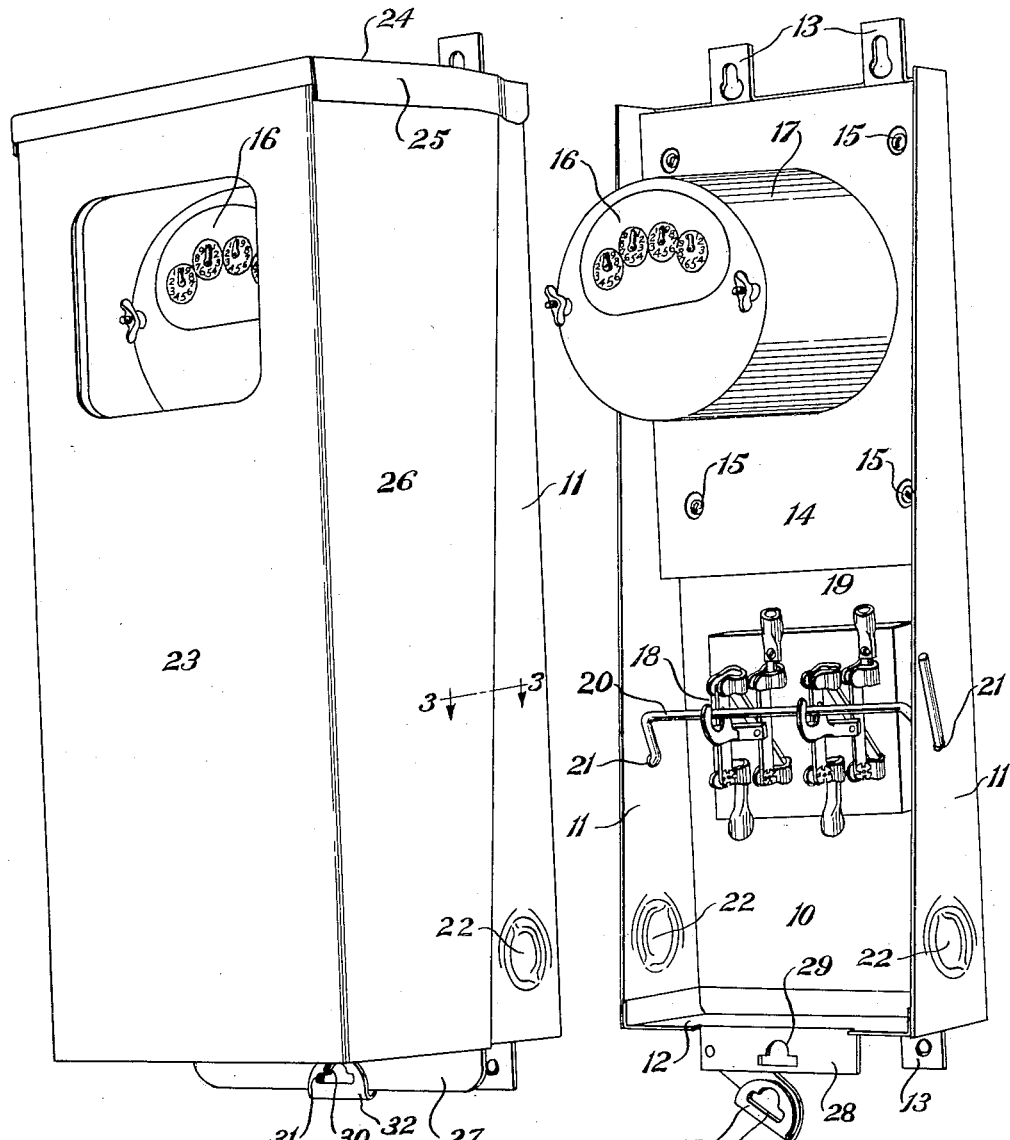

Nov. 6, 1934.  M. J. LEWIS  1,979,949
METER BOX
Filed Sept. 15, 1931

Morgan J. Lewis
INVENTOR
BY Frease and Bishop
ATTORNEYS

Patented Nov. 6, 1934

1,979,949

UNITED STATES PATENT OFFICE 1,979,949

METER BOX

Morgan J. Lewis, Massillon, Ohio, assignor to The Code Electric Products Corporation, Philadelphia, Pa., a corporation of Pennsylvania Application September 15, 1931, Serial No. 562,855

2 Claims. (Cl. 247—2)

The invention relates to boxes for use at the entrance of electric lines to buildings and the like and more particularly to a box designed to house a meter and switch.

In boxes of this kind it is desirable that the side walls at the upper portion of the box, which houses the meter, be quite narrow in order to permit access to the sides of the meter for adjusting the same. It is frequently necessary to use a screw driver for making adjustments upon the sides of the meter and, unless the side walls of the box are quite narrow at this point, it is difficult, if not impossible, to make such adjustments when the meter is mounted within the box.

As it is desirable to house the switch in the same box with the meter, it is preferable that the lower portions of the side walls of the box be of greater width in order to provide a bearing for the switch handle. This also accommodates knocks-outs in these lower portions of the side walls, which could not be provided if they were as narrow as required adjacent to the meter.

An object of the present invention is to provide a meter box having side walls of a proper width adjacent to the meter to permit a screw driver or the like to be used upon the sides of the meter to adjust the same, the width of the side walls at the lower portion of the box being sufficient to provide a bearing for the switch handle and to accommodate knock-outs.

The above and other objects may be attained by providing a box comprising a base portion or meter mounting section having side walls substantially coextensive with the entire length of the rear wall and tapering in width substantially throughout their length, so as to provide for knock-outs and bearings for the switch handle at the wider portions of said side walls, while permitting ready access to the sides of the meter installed between the narrower portions of said side walls; a cover for the base section may be provided, which cover has side walls substantially co-extensive with the entire length of the front wall and tapering in width substantially throughout their length in the opposite direction, so as to overlap the side walls of the base section in substantially parallel edge relationship therewith and form a complete meter and switch closure having rectangular side faces.

An embodiment of the invention is illustrated in the accompanying drawing, in which Figure 1 is a perspective view of the improved meter box with the cover in closed position thereon;

Fig. 2, a similar view showing the cover removed and displaying the meter and switch within the box; and Fig. 3, an enlarged fragmental cross-sectional view taken on the plane indicated by the line 3—3 of Fig. 1.

Similar numerals refer to similar parts throughout the drawing.

The improved meter box shown in the drawing may be formed of sheet metal or the like and its base section includes the back wall 10 of rectangular shape, side walls 11 uniformly tapered from the bottom to the top of the box, and the bottom end wall 12. Suitable means, such as the lugs 13, may be provided for attaching the back wall 10 of the box to a wall or other support.

A board 14, of suitable insulation material, may be attached to the inner face of the back wall 10 as by the screws 15 for the purpose of mounting thereon the meter 16, of any usual and well known construction, which is to be housed within the case 17. As shown in Fig. 2, the upper portions of the side walls 11, adjacent to the meter, are sufficiently narrow to permit access to the sides of the meter by means of a screw driver or the like.

A switch, indicated generally at 18, and having a base 19 of suitable insulation material, may be mounted upon the back wall 10 below the meter, and is provided with the usual operating handle 20. At this point it will be seen that the side walls 11 are of sufficient width to provide bearings, as at 21, for the switch handle.

The lower end portions of the side walls, adjacent to the bottom wall 12, are sufficiently wide to accommodate knock-outs, as shown at 22, which may be removed if it is desired to locate wires through these side walls of the box.

The cover section of the box is entirely removable from the meter mounting section and includes the rectangular front wall 23, the downwardly tapered side walls 26 overlapping the side walls 11, the top wall 24 having a rearward extension supported by the upper edges of the meter mounting section including the side walls 11, and the bottom end wall having at its rear edge a depending flange 27. The top 24 has depending overlapping flanges 25 forming a water-tight closure with the upper end marginal portions of the meter mounting section and which also serve to lock the cover section into place.

For the purpose of connecting the cover to the lower end of the base section, a depending flange 28 may be formed upon the bottom wall 12 of the base section and provided with an opening 29 adapted to register with the opening 30 in the cover flange 27 and with the opening 31 in the pivoted latch member 32, so that a lock, seal or the like may be placed through all of said openings.

In order to form tight joints at the side edges of the box, the side walls 26 of the cover may be provided with channel edges (Fig. 3) formed by spot welding or otherwise connecting the angular strips 34 thereto, to receive the marginal side portions of the side walls 11.

From the above it will be obvious that a meter box is provided which may suitably house a switch, the side walls of this box being so shaped as to permit ready access to the sides of the meter installed between their narrowest portions, and the provision of bearings for the switch handle and of knock-outs in their lower portions.

If desired, a test block of any suitable construction may be housed in the meter box adjacent to the switch above described, or a test block may be used in this box in place of the switch.

I claim:

1. An electric meter housing comprising a rectangular metal box the side walls of which are parted on diagonal lines extending from top to bottom and located intermediate the front and rear walls of the box to form the box into front and rear sections, the bottom being parted along a line joining the lower ends of the side parting lines, the top of the box being carried on the front section and engaging the upper ends of the sides and rear wall of the rear section to support the front section and downwardly extending perforated lips on the two portions of the bottom by means of which the two sections may be locked together.

2. A box for housing an electric meter comprising a meter mounting section having a rear wall, a bottom wall and side walls substantially co-extensive with the entire length of said rear wall and tapering in width substantially throughout their length, and a cover section fitting said meter mounting section having a front wall and side walls substantially co-extensive with the entire length of said front wall and tapering in width throughout their length in a direction to cause them to overlap the side walls of said meter mounting section in substantially parallel edge relationship therewith, a top wall overlapping the upper ends of the rear wall and the side walls of the base section to secure the cover section thereon, a bottom wall cooperating with the bottom wall of the meter carrying section, and downwardly extending flanges on the two bottom sections perforated to accommodate a fastening device for securing the sections together.

MORGAN J. LEWIS.